US009074673B2

(12) United States Patent
Mizuno et al.

(10) Patent No.: US 9,074,673 B2
(45) Date of Patent: Jul. 7, 2015

(54) SHIFT ACTUATOR LAYOUT STRUCTURE IN VEHICLE

(75) Inventors: Kinya Mizuno, Wako (JP); Yasushi Fujimoto, Wako (JP); Masazumi Naito, Wako (JP); Toshimasa Mitsubori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 522 days.

(21) Appl. No.: 13/410,823

(22) Filed: Mar. 2, 2012

(65) Prior Publication Data

US 2012/0247254 A1    Oct. 4, 2012

(30) Foreign Application Priority Data

Mar. 29, 2011 (JP) .................. 2011-071603

(51) Int. Cl.
*B60K 20/02* (2006.01)
*F16H 59/02* (2006.01)
(52) U.S. Cl.
CPC ........... *F16H 59/02* (2013.01); *Y10T 74/20055* (2015.01); *B60Y 2200/12* (2013.01); *F16H 2059/0234* (2013.01)
(58) Field of Classification Search
CPC .............. F16H 2057/0203; F16H 2057/02065; F16H 2057/02086; F16H 2057/02008; F16H 57/02; F16H 61/02; B60Y 2200/12; B60K 17/08; B60K 5/04; B62M 7/02; B62D 37/00
USPC ............... 74/335, 473.16, 606 R, 325, 421 A, 74/473.19, 473.26, 473.36, 640; 180/219, 180/230, 344, 374; 123/197.1; 475/209
See application file for complete search history.

(56) References Cited

U.S. PATENT DOCUMENTS

| 4,574,652 | A | * | 3/1986 | Shichinohe et al. | ........ 74/473.21 |
|---|---|---|---|---|---|
| 5,261,504 | A | * | 11/1993 | Katsura | ........................ 180/219 |
| 5,662,195 | A | * | 9/1997 | Rush | ............................ 192/3.51 |
| 6,003,407 | A | * | 12/1999 | Cavalier | ...................... 74/594.1 |
| 6,085,607 | A | * | 7/2000 | Narita et al. | ..................... 74/335 |
| 6,453,762 | B1 | * | 9/2002 | Nishikawa et al. | ............. 74/335 |
| 6,547,023 | B2 | * | 4/2003 | Laimbock | ..................... 180/227 |
| 6,591,934 | B2 | * | 7/2003 | Tsutsumikoshi | ............. 180/291 |
| 6,612,391 | B2 | * | 9/2003 | Yamauchi | ..................... 180/292 |
| 7,096,753 | B2 | * | 8/2006 | Kawakubo et al. | .......... 74/337.5 |
| 7,174,800 | B2 | * | 2/2007 | Kawakubo et al. | .......... 74/337.5 |
| 7,198,021 | B2 | * | 4/2007 | Kawakubo et al. | ........ 123/198 P |
| 7,350,881 | B2 | * | 4/2008 | Asahi | ............................ 303/137 |
| 7,387,042 | B2 | * | 6/2008 | Suzuki et al. | .................... 74/335 |
| 7,565,891 | B2 | * | 7/2009 | Takano et al. | ............. 123/195 R |
| 7,588,009 | B2 | * | 9/2009 | Kurokawa et al. | ......... 123/193.5 |

(Continued)

FOREIGN PATENT DOCUMENTS

DE        10260627 A1    7/2003
DE   602005001903 T2   12/2007

(Continued)

*Primary Examiner* — William Kelleher
*Assistant Examiner* — Valentin Craciun
(74) *Attorney, Agent, or Firm* — Rankin, Hill & Clark LLP (57) ABSTRACT

In a vehicle having a generator cover mounted on one side of a crankcase so as to cover an end portion of a crankshaft projecting from the crankcase and a shift spindle located on the rear side of the generator cover as an input member of a shifting mechanism, a shift actuator is located below the longitudinal range of the generator cover in parallel to the crankshaft and on the front side of the axis of the shift spindle.

11 Claims, 7 Drawing Sheets

(56) References Cited

U.S. PATENT DOCUMENTS

| | | | |
|---|---|---|---|
| 8,015,891 B2* | 9/2011 | Ogasawara | 74/335 |
| 8,371,412 B2* | 2/2013 | Sato | 180/230 |
| 8,397,596 B2* | 3/2013 | Tomoda et al. | 74/337.5 |
| 8,448,740 B2* | 5/2013 | Inui et al. | 180/292 |
| 8,689,923 B2* | 4/2014 | Kishikawa | 180/219 |
| 8,720,292 B2* | 5/2014 | Fujimoto et al. | 74/337.5 |
| 2004/0124029 A1* | 7/2004 | Takenaka et al. | 180/291 |
| 2005/0016488 A1* | 1/2005 | Kawakubo et al. | 123/192.2 |
| 2005/0081664 A1* | 4/2005 | Kawakubo et al. | 74/337.5 |
| 2007/0272196 A1* | 11/2007 | Nishi et al. | 123/196 R |
| 2008/0127766 A1* | 6/2008 | Ogasawara | 74/473.16 |
| 2009/0107429 A1* | 4/2009 | Maehara et al. | 123/90.12 |
| 2011/0239805 A1* | 10/2011 | Fujimoto et al. | 74/473.12 |
| 2014/0290405 A1* | 10/2014 | Sugano et al. | 74/335 |

FOREIGN PATENT DOCUMENTS

| | | |
|---|---|---|
| JP | 11-082734 | 3/1999 |
| JP | 2007-098983 | 4/2007 |
| JP | 2010-111389 | 5/2010 |
| JP | 2010-196855 | 9/2010 |
| JP | 2010-260548 | 11/2010 |

* cited by examiner

FIG. 7

SHIFT ACTUATOR LAYOUT STRUCTURE IN VEHICLE

BACKGROUND OF THE INVENTION

1. Field of the Invention

The present invention relates to a shift actuator layout structure in a vehicle including a power unit having a transmission provided in a crankcase, a shifting device configured to change a shift position in the transmission, and an actuator for operating the shifting device.

2. Description of Related Art

A shifting mechanism for a motorcycle arranged such that an electric shift actuator is used to perform shift changing (shifting) is known in the art. In the shifting mechanism of this type, the shift actuator is mounted on a crankcase of an engine on the rear side of a cylinder of the engine so as to extend in the longitudinal direction of the vehicle and the shift actuator is connected through a link mechanism to a shift spindle provided below the engine (see Japanese Patent Laid-open No. 2010-260548, for example).

In a saddle seat type vehicle such as a motorcycle, it is necessary to ensure a foot rest space for a rider in the vicinity of an engine. Accordingly, in the aforementioned prior art, the shift actuator is mounted on the crankcase at a rear side of the cylinder, thereby using a dead space on the front upper side of a main step for supporting the feet of the rider to locate the shift actuator in this dead space.

However, in such a layout the shift actuator and the shift spindle in the shifting mechanism are located distantly from each other in a vertical direction, the link mechanism for connecting the shift actuator and the shift spindle is increased in length and it is further necessary to ensure a space for locating this link mechanism.

SUMMARY OF THE INVENTION

The present invention is directed toward a shift actuator layout structure in a vehicle that can compactly arrange a shift actuator and a shifting mechanism including a shift spindle and can ensure a foot rest space for a rider.

In accordance with the present invention, there is provided a shift actuator layout structure in a vehicle having a crankcase for rotatably supporting a crankshaft extending in the lateral direction of the vehicle, a power unit having a transmission provided in the crankcase, a shifting device configured to change a shift position in the transmission, and a shift actuator for operating the shifting device. The vehicle has a cover member mounted on one side of the crankcase so as to cover an end portion of the crankshaft projecting from the crankcase and also has a shift spindle located on the rear side of the cover member as an input member of the shifting device. The shift actuator is located below the longitudinal range of the cover member in parallel to the crankshaft and on the front side of the axis of the shift spindle.

Accordingly, the dead space below the first cover member can be efficiently used to locate the shift actuator. Further, the shift actuator can be located near the shift spindle and below the foot rests included in the vehicle. Also, the shift actuator and the shifting mechanism including the shift spindle can be arranged compactly and a foot rest space for the rider can also be ensured.

In further accordance with the present invention, the cover member is a first cover member having an arcuate wall surface convex toward the shift actuator above the shift actuator. The vehicle has a second cover member located adjacent to the first cover member. The second cover member has an arcuate wall surface convex toward the first cover member. The shift spindle is located in an area surrounded by the arcuate wall surfaces of the two cover members.

Accordingly, the dead space between the first and second cover members can be used to locate the shift spindle, thereby making the power unit compact.

In accordance with another aspect of the invention, a gear mechanism is provided between the shift spindle and the shift actuator. At least a part of the gear mechanism is located in the area surrounded by the arcuate wall surfaces of the two cover members. Accordingly, the dead space between the first and second cover members can be used to locate the gear mechanism with its protuberance suppressed, thereby making the power unit compact.

Preferably, the gear mechanism has a plurality of gears, and the gears are located on the front lower side of the shift spindle and arranged along the arcuate wall surface of the first cover member. Accordingly, the gear mechanism can be arranged compactly.

Preferably, the shift actuator is located at a level higher than that of the lowermost gears of the plural gears. Accordingly, it is possible to suppress that the ground clearance of the vehicle may become too small and that the bank angle of the vehicle may be limited.

Further, the vehicle has an exhaust pipe extending rearward from the power unit. The exhaust pipe is located below the shift actuator. Accordingly, the exhaust pipe need not be bent so as to bypass the shift actuator, but can be arranged straight toward the rear side of the vehicle.

In accordance with another aspect of the invention, the vehicle is a small-sized vehicle having a seat adapted to be straddled by a rider. The vehicle has foot rests for supporting the feet of the rider sitting on the seat, and the shift actuator is located at a level lower than that of the foot rests. Accordingly, the shift actuator can be protected from the feet of the rider, and the comfort of the rider can also be ensured.

In further accordance with the present invention, the foot rests are formed as floor steps elongated in the longitudinal direction of the vehicle, and the shift actuator is located at a level lower than that of support frames for supporting the floor steps. Accordingly, the shift actuator can be spaced apart from the support frames, and the shift actuator can be protected by the support frames.

In accordance with another aspect of the invention, the vehicle has under covers for covering the lower side of the foot rests, and the shift actuator is covered on one side thereof by the under covers. Accordingly, the shift actuator can also be protected by the under covers.

DETAILED DESCRIPTION OF THE PREFERRED EMBODIMENTS

A mode for carrying out the present invention will now be described with reference to the drawings. The terms of "front," "rear," "right," "left," "upper," and "lower" in the following description mean the directions as viewed from an operator riding on a vehicle to be hereinafter described unless otherwise specified. Further, in the drawings, there are suitably shown an arrow FR indicating the front side of the vehicle, an arrow UP indicating the upper side of the vehicle, and an arrow R indicating the right side of the vehicle.

Figure 1:
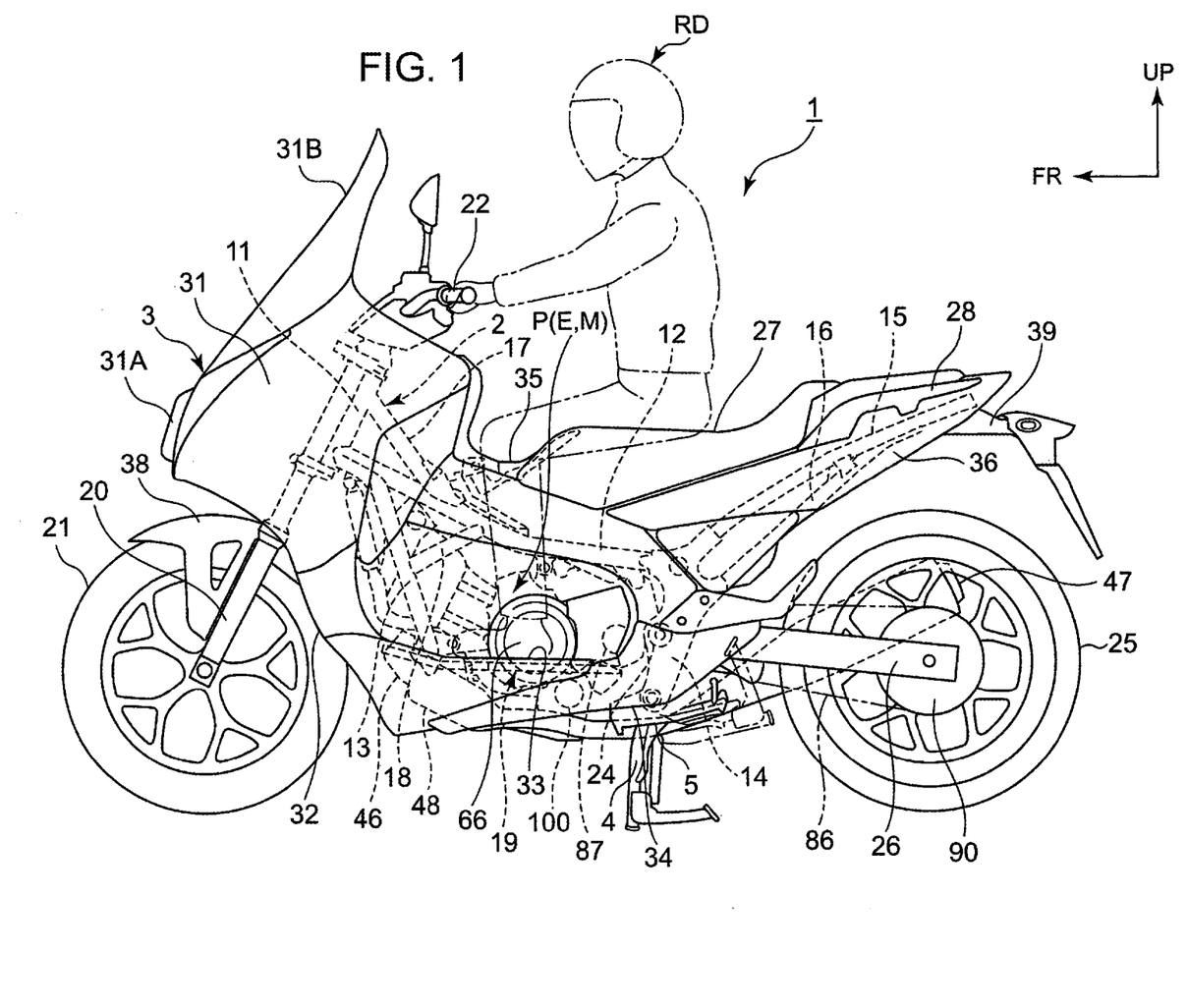
FIG. 1 is a left side view of a motorcycle according to a first preferred embodiment of the present invention.

FIG. 1 is a left side view of a motorcycle 1 according to a first preferred embodiment of the present invention. FIG. 1 shows a condition where a rider (operator) RD is riding on the motorcycle 1.

The motorcycle 1 has a body frame 2 configured by integrally connecting a plurality of kinds of metal parts by welding or the like. The body frame 2 includes a head pipe 11, right and left main frames 12 extending rearward from the head pipe 11 so as to be inclined downward, right and left down frames 13 extending downward from the right and left main frames 12, respectively, and supporting a front end portion of a power unit P, right and left pivot frames 14 connected to the rear end portions of the right and left main frames 12, respectively, right and left seat rails 15 connected to the rear portions of the right and left pivot frames 14, respectively, and extending rearward therefrom so as to be inclined upward, and right and left back stays 16 bridging the right and left pivot frames 14 and the right and left seat rails 15, respectively.

The members (the head pipe 11, the main frames 12, the down frames 13, the seat rails 15, and the back stays 16) of the body frame 2 other than the pivot frames 14 are formed from metal pipes of a metal material such as steel, and the pivot frames 14 are formed from plate-like members of a metal material. Reference numeral 17 denotes a pair of right and left upper reinforcing frames bridging the head pipe 11 and the right and left main frames 12, respectively, and reference numeral 18 denotes a right and left lower reinforcing frames bridging the right and left main frames 12 and the right and left down frames 13, respectively.

Figure 2:
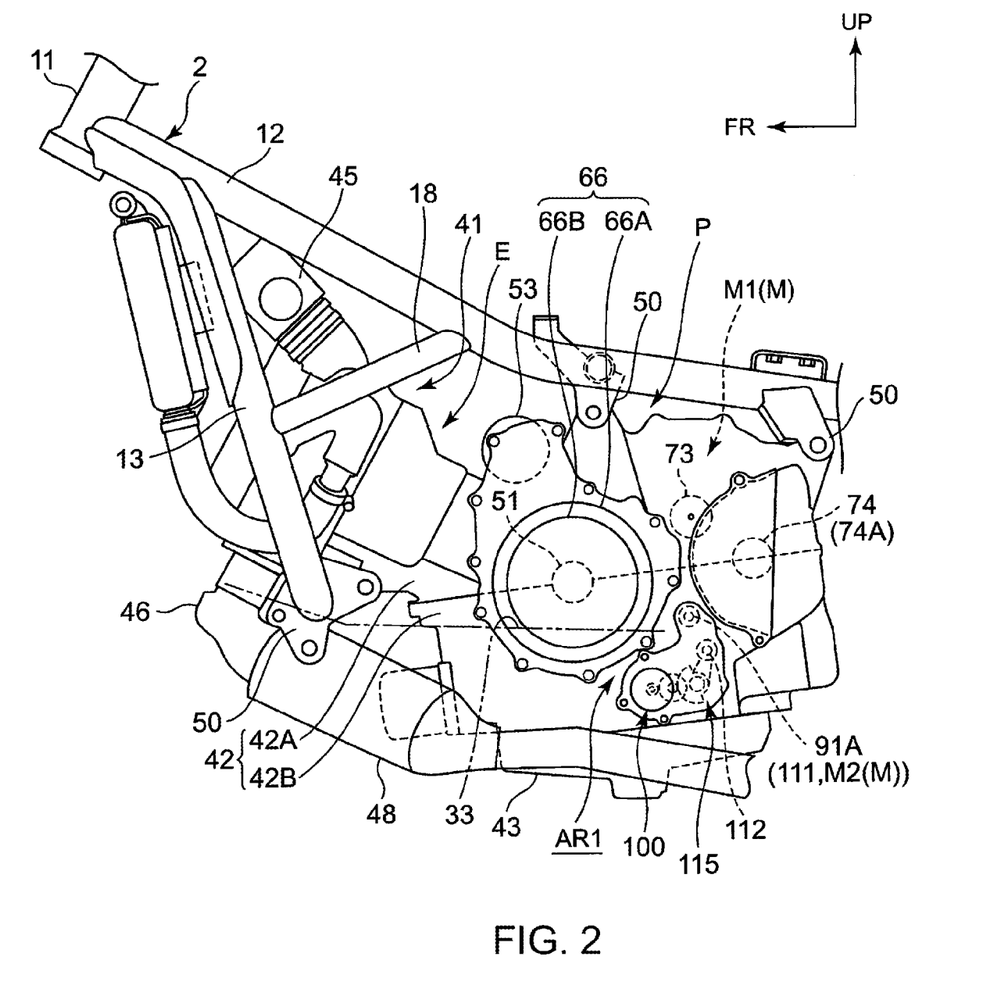
FIG. 2 is a left side view of a front portion of a body frame of the motorcycle.

FIG. 2 is a left side view of a front portion of the body frame 2 of the motorcycle 1.

The head pipe 11 is located in a front portion of the vehicle at the laterally central position thereof so as to be inclined upward toward the rear side of the vehicle with respect to a horizontal line. Right and left front forks 20 (see FIG. 1) are steerably supported to the head pipe 11. As shown in FIG. 1, a front wheel 21 is rotatably supported to the lower portions of the front forks 20, and a steering handle 22 is supported to the upper portions of the front forks 20. Thus, the head pipe 11 supports a steering device constituting a steering system in the motorcycle 1.

As shown in FIG. 2, the right and left main frames 12 extend rearward from the lower portion of the head pipe 11 so as to be inclined downward toward the rear side of the vehicle and to extend laterally outward toward the rear side of the vehicle. The rear ends of the right and left main frames 12 are connected to the upper front portions of the right and left pivot frames 14, respectively (see FIG. 1).

The right and left pivot frames 14 extend downward from the rear portions of the right and left main frames 12, respectively, and a pivot shaft 24 (see FIG. 1) is supported to the vertically intermediate portions of the right and left pivot frames 14. The pivot shaft 24 extends in the lateral direction of the vehicle, and a rear arm (called also a swing arm) 26 (see FIG. 1) is vertically swingably supported to the pivot shaft 24. A rear wheel 25 (see FIG. 1) is rotatably supported to the rear portions of the rear arm 26.

The power unit P for driving the vehicle is supported in an area at the front lower portion of the vehicle as surrounded by the main frames 12, the down frames 13, and the pivot frames 14. A seat 27 (see FIG. 1) is supported above the power unit P.

As shown in FIG. 1, the seat 27 is formed as an integrated tandem seat extending in the longitudinal direction of the vehicle so that the operator and a passenger can sit on the seat 27 in tandem so as to straddle it. The seat 27 is supported to the right and left seat rails 15.

The motorcycle 1 is of a full cover type having a body cowl 3 for substantially fully covering the body frame 2. Further, the motorcycle 1 has a center stand 4 adapted to be used in parking the vehicle in a vertical position with respect to a ground surface and also has a side stand 5 adapted to be used in parking the vehicle in an inclined condition where the vehicle body is inclined to the left side.

The body cowl 3 is formed as a full cowling for substantially fully covering the body frame 2. That is, as shown in FIG. 1, the body cowl 3 includes a front cowl 31 for covering the front portion of the vehicle body including the head pipe 11, right and left leg shields 32 continuously connected to the front cowl 31 for covering the front side of the legs of the rider RD, right and left foot rests 33 extending rearward from the lower portions of the right and left leg shields 32, respectively, right and left under covers 34 for covering the lower side of the right and left foot rests 33, respectively, a center tunnel 35 for covering the upper side of the main frames 12, and right and left side covers 36 connected to the foot rests 33 and the center tunnel 35 for covering the right and left seat rails 15 and the right and left back stays 16, respectively.

The foot rests 33 are members for supporting the feet of the rider RD sitting on the seat 27, and they are formed as floor steps extending substantially horizontally on the right and left sides of the power unit P and elongated in the longitudinal direction of the vehicle. To support the foot rests 33 elongated in the longitudinal direction of the vehicle, the body frame 2 is provided with right and left support frames 19 extending in the longitudinal direction of the vehicle on the right and left sides of the power unit P. The right and left foot rests 33 are fixed to the right and left support frames 19 on the upper side thereof, respectively.

The front cowl 31 is a large-sized front cowl extending from a headlight 31A as the center to the upper, lower, right, and left sides. The front cowl 31 is provided with a windshield 31B inclined upward toward the rear side of the vehicle with respect to a horizontal line. A front fender 38 is provided above the front wheel 21, and a rear fender 39 is provided above the rear wheel 25. Right and left grab rails 28 are provided on the right and left sides of a rear portion of the seat 27.

Figure 3:
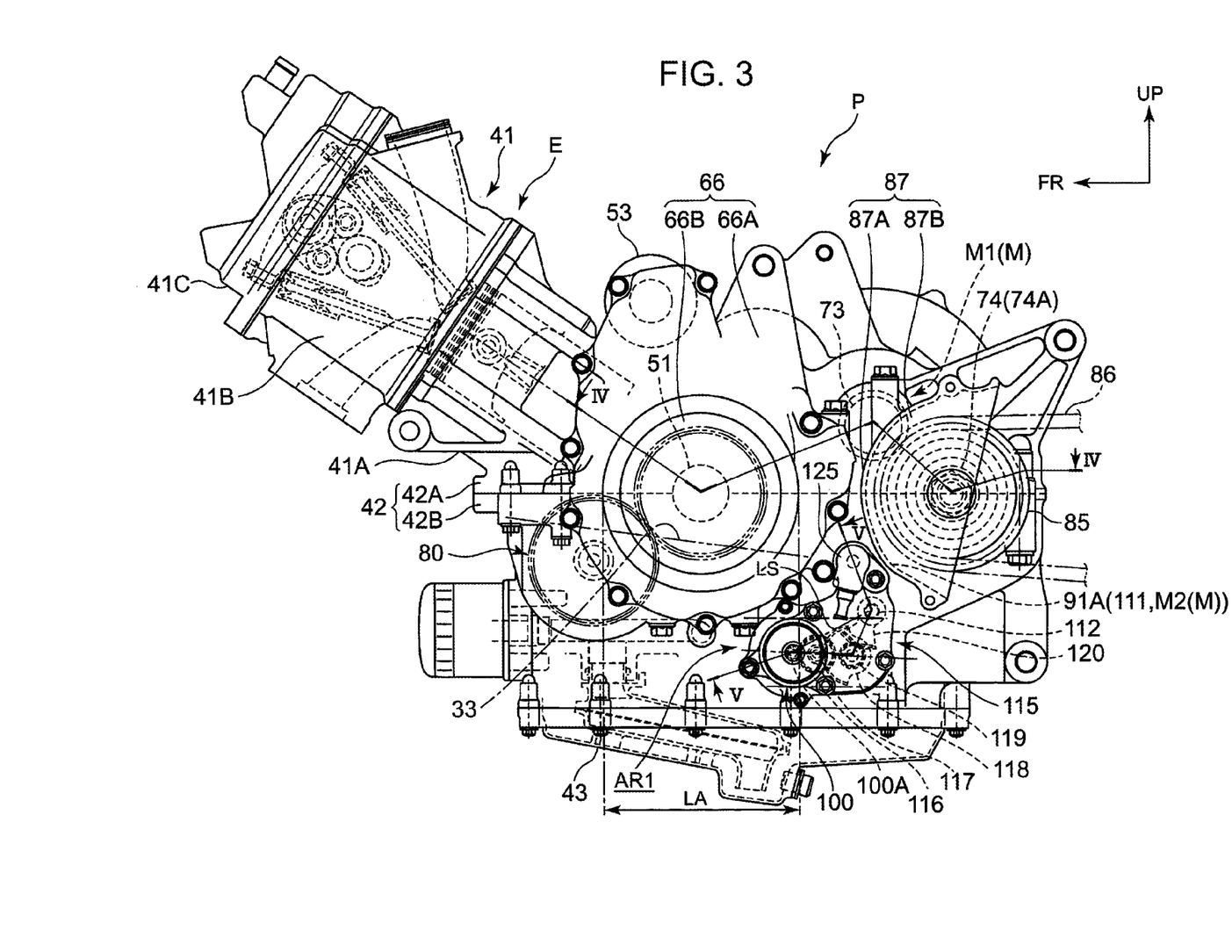
FIG. 3 is a left side view of a power unit.

The power unit P will now be described. FIG. 3 is a left side view of the power unit P. The power unit P includes a multi-cylinder (two-cylinder in this preferred embodiment) engine (internal combustion engine) E having a crankcase 42 and a cylinder portion 41 extending frontward from the front portion of the crankcase 42 so as to be inclined upward toward the front side of the vehicle with respect to a horizontal line. The power unit P further includes a transmission M provided in the crankcase 42 of the engine E. As shown in FIG. 2, the power unit P is supported through a plurality of engine brackets 50 to the body frame 2.

The cylinder portion 41 includes a cylinder block 41A contiguous to the front portion of the crankcase 42, a cylinder head 41B connected to the cylinder block 41A, and a head cover 41C connected to the cylinder head 41B. Further, an oil pan 43 is connected to the lower portion of the crankcase 42.

As shown in FIG. 2, a throttle body 45 is connected to the back surface of the cylinder portion 41 (the back surface of the cylinder head 41B), and a fuel-air mixture obtained by mixing fuel and air is supplied through the throttle body 45 to the engine E. An exhaust pipe 46 is connected to the front surface of the cylinder portion 41 (the front surface of the cylinder head 41B). The exhaust pipe 46 extends rearward below the power unit P and is connected to an exhaust muffler 47 located on the right side of the rear wheel 25 as shown in FIGS. 1 and 2. Further, a catalytic converter 48 is provided in the exhaust pipe 46 (at a position near the cylinder portion 41).

A crankshaft 51 is supported to the crankcase 42 so as to extend in the lateral direction of the vehicle. The crankcase 42 is composed of an upper case half 42A and a lower case half 42B dividably joined together along a joining surface parallel to a horizontal plane on which the axis of the crankshaft 51 lies. The cylinder block 41A is integral with the upper case half 42A.

Figure 4:
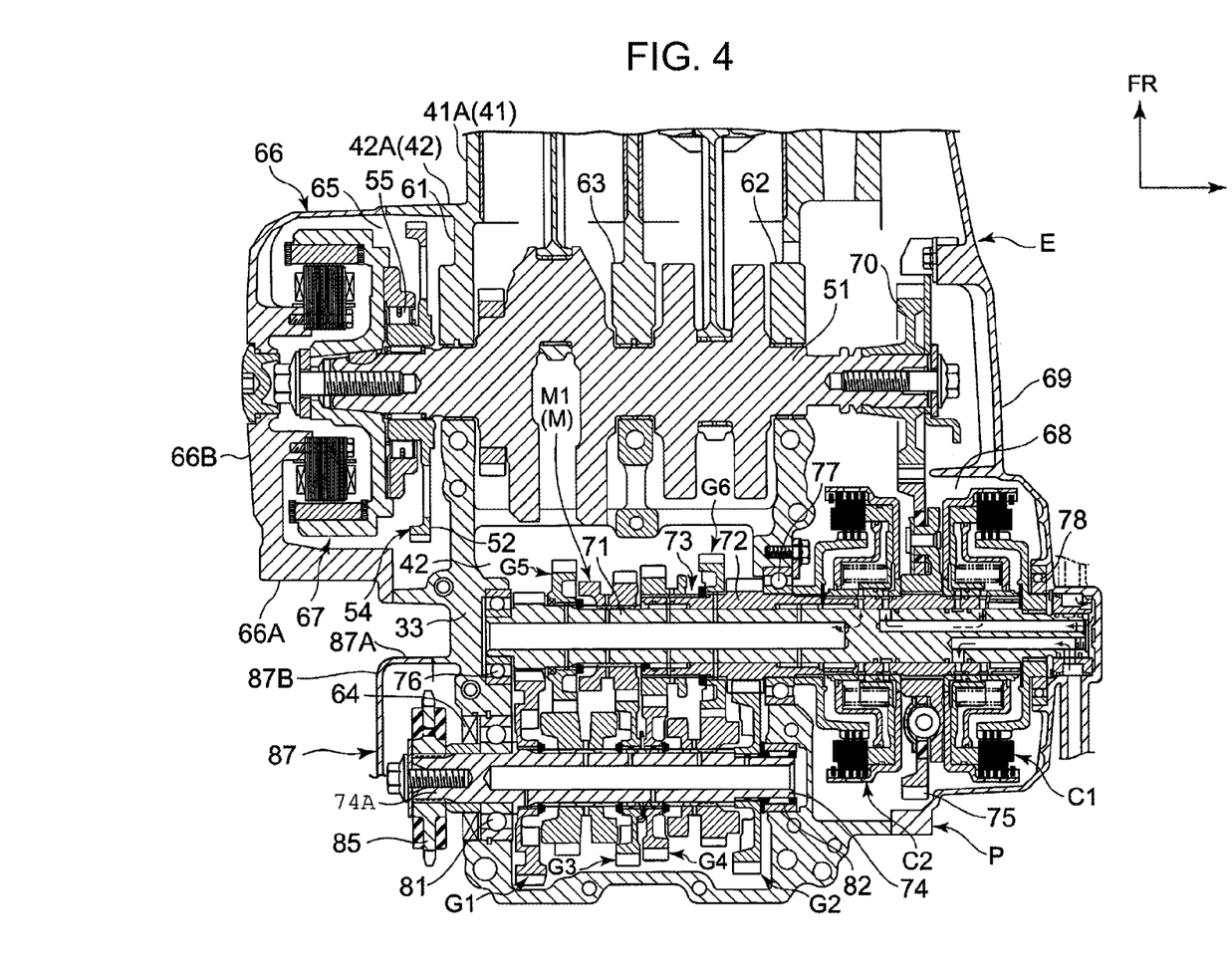
FIG. 4 is a cross section taken along the line IV-IV in FIG. 3.

FIG. 4 is a cross section taken along the line IV-IV in FIG. 3. As shown in FIG. 4, the crankshaft 51 is rotatably supported to the front portion of the crankcase 42 along the vehicle width direction. The crankshaft 51 is supported to left and right side walls 61 and 62 of the crankcase 42 and a support wall 63 provided between the left and right side walls 61 and 62.

The left end portion of the crankshaft 51 extends through the left side wall 61 of the crankcase 42 to the outside of the crankcase 42. A generator cover (first cover member) 66 is connected to the front portion of the left side wall 61 so as to define a generator chamber 65. The left end portion of the crankshaft 51 projects into this generator chamber 65. A generator 67 for generating electricity by the rotation of the crankshaft 51 is provided in the generator chamber 65. Further, a driven gear 52 for starting is provided in the generator chamber 65. A starter motor 53 (see FIG. 3) is provided in the vicinity of the upper surface of the crankcase 42 at a position near the back surface of the cylinder portion 41. The driven gear 52 constitutes a part of a speed reducing gear train 54 for transmitting the rotation of a drive shaft of the starter motor 53 to the crankshaft 51. The driven gear 52 is connected through a one-way clutch 55 to the crankshaft 51.

The right end portion of the crankshaft 51 extends through the right side wall 62 of the crankcase 42 to the outside of the crankcase 42. A clutch cover 69 is connected to the right side wall 62 so as to define a clutch chamber 68. The right end portion of the crankshaft 51 projects into the clutch chamber 68. A drive gear 70 for transmitting the rotation of the crankshaft 51 to the transmission M is mounted on the right end portion of the crankshaft 51.

The transmission M is a twin-clutch type transmission, and it includes a transmission M1 having twin clutches C1 and C2, a shifting mechanism (shifting means) M2 for changing a shift position in the transmission M1, and a shift actuator 100 for operating the shifting mechanism M2.

The transmission M1 has a main shaft 73 having a double structure including an inner shaft 71 and an outer shaft 72 and a counter shaft 74 extending parallel to the main shaft 73. The transmission M1 further includes a plurality of shift gear trains G1 to G6 corresponding to a plurality of (six in this preferred embodiment) shift positions provided between the main shaft 73 and the counter shaft 74.

As shown in FIGS. 3 and 4, the crankshaft 51 and the counter shaft 74 are spaced apart from each other in the longitudinal direction of the vehicle and supported parallel to the joining surface of the crankcase 42. The counter shaft 74 is located on the rear side of the crankshaft 51. The main shaft 73 is supported on the rear upper side of the crankshaft 51 and on the front upper side of the counter shaft 74, i.e., at a position between the crankshaft 51 and the counter shaft 74 and above the joining surface of the crankcase 42. Accordingly, the transmission M1 including the main shaft 73 and the counter shaft 74 is accommodated in the rear upper portion of the crankcase 42.

With this shaft arrangement, the shafts 51, 73, and 74 can be arranged with the spacing therebetween reduced, so that the length of the crankcase 42 in the longitudinal direction of the vehicle can be suppressed. Further, a balancer 80 (see FIG. 3) is accommodated in the crankcase 42 on the front lower side of the crankshaft 51.

As shown in FIG. 4, a driven gear 75 meshing with the drive gear 70 mounted on the right end portion of the crankshaft 51 is relatively rotatably mounted on the main shaft 73.

The main shaft 73 is rotatably supported through a plurality of bearings 76, 77, and 78 to the left side wall 61, the right side wall 62, and the clutch cover 69 of the crankcase 42, respectively. The right portion of the inner shaft (first shaft) 71 constituting the main shaft 73 is relatively rotatably inserted in the outer shaft (second shaft) 72 constituting the main shaft 73. The driven gear 75 is relatively rotatably mounted on the outer circumference of the inner shaft 71. The driven gear 75 is connected/disconnected through the twin clutches C1 and C2 to/from the inner and outer shafts 71 and 72, respectively.

The twin clutches C1 and C2 are hydraulic clutches arranged coaxially with the main shaft 73 so as to be opposed to each other with the driven gear 75 interposed therebetween. The engagement/disengagement of the twin clutches C1 and C2 is controlled by a clutch control device (not shown).

As mentioned above, the right portion of the inner shaft (first shaft) 71 of the main shaft 73 is relatively rotatably inserted in the outer shaft (second shaft) 72 of the main shaft 73. The inner shaft 71 is connected/disconnected through the clutch C1 to/from the driven gear 75, and the outer shaft 72 is connected/disconnected through the clutch C2 to/from the driven gear 75. Drive gears corresponding to the odd-numbered shift positions (first, third, and fifth speeds) of the plural shift gear grains G1 to G6 are provided on the outer circumference of the inner shaft 71, and drive gears corresponding to the even-numbered shift positions (second, fourth, and sixth speeds) of the plural shift gear trains G1 to G6 are provided on the outer circumference of the outer shaft 72.

The counter shaft 74 is rotatably supported through left and right bearings 81 and 82 to the left and right side walls 61 and 62 of the crankcase 42, respectively. Driven gears of the plural shift gear trains G1 to G6 are provided on the counter shaft 74.

The left end portion of the counter shaft 74 extends through the left side wall 61 of the crankcase 42 to the outside of the crankcase 42, and a drive sprocket 85 is mounted on the left end portion of the counter shaft 74. A chain 86 (see FIGS. 1 and 3) is wrapped between the drive sprocket 85 and a driven sprocket 90 (see FIG. 1) fixed to the rear wheel 25. Accordingly, the rotation of the drive sprocket 85 is transmitted through the chain 86 to the driven sprocket 90, thereby rotationally driving the rear wheel 25.

In other words, the left end portion of the counter shaft 74 functions as an output shaft 74A of the power unit P. The output shaft 74A, the drive sprocket 85, and the chain 86 are covered with a sprocket cover (second cover member) 87 provided on the rear portion of the left side wall 61 of the crankcase 42.

The shifting mechanism M2 and the shift actuator 100 will now be described.

Figure 5:
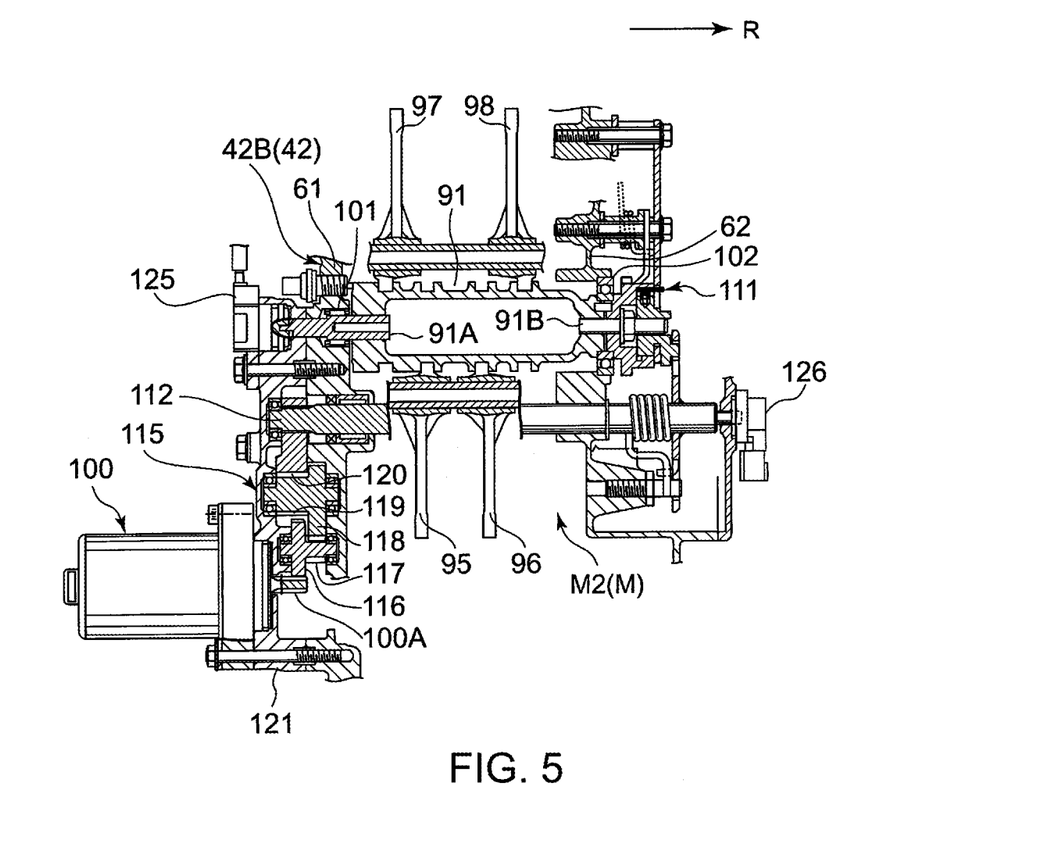
FIG. 5 is a cross section taken along the line V-V in FIG. 3.

FIG. 5 is a cross section taken along the line V-V in FIG. 3. As shown in FIG. 5, the shifting mechanism M2 includes a shift drum 91 extending parallel to the main shaft 73 and the counter shaft 74 and a plurality of (four in this preferred embodiment) shift forks 95 to 98 axially movable by the shift drum 91. The shift forks 95 to 98 are axially moved by the rotation of the shift drum 91, thereby changing the shift gear trains G1 to G6 to be used for power transmission between the main shaft 73 and the counter shaft 74.

The shift drum 91 is rotatably supported through bearings 101 and 102 to the left and right side walls 61 and 62 of the lower case half 42B of the crankcase 42. The shift drum 91 is located below the main shaft 73 between the crankshaft 51 and the counter shaft 74.

A support shaft 91A provided at the left end of the shift drum 91 extends through the left side wall 61 of the lower case half 42B to the outside of the crankcase 42. A rotational angle of the support shaft 91A is detected by a shift position sensor 125. A support shaft 91B provided at the right end of the shift drum 91 is connected through a ratchet mechanism 111 to a shift spindle 112. The ratchet mechanism 111 functions to control a rotational amount of the shift drum 91.

The shift spindle 112 is located on the rear lower side of the shift drum 91 as viewed in side elevation. The shift spindle 112 is rotatably supported to the left and right side walls 61 and 62 of the lower case half 42B of the crankcase 42, and functions as an input member of the shifting mechanism M2.

That is, the shift spindle 112 laterally extends through the left and right side walls 61 and 62 to the outside of the crankcase 42. The right end portion of the shift spindle 112 projects into the clutch chamber 68 and is connected to the ratchet mechanism 111 provided in the clutch chamber 68. The shift drum 91 is rotated by the rotation of the shift spindle 112 to thereby change a shift position in the transmission M1. The left end portion of the shift spindle 112 projects to the outside of the crankcase 42 and is connected through a power transmitting mechanism 115 to the shift actuator 100.

The shift actuator 100 is provided by an electric motor to rotationally drive the shift spindle 112 through the power transmitting mechanism 115 provided between the shift actuator 100 and the shift spindle 112, thereby operating the shifting mechanism M2.

The shift actuator 100 is mounted through a support plate 121 to the left side wall 61 of the lower case half 42B of the crankcase 42. A drive shaft 100A of the shift actuator 100 extends through the support plate 121 and is exposed to a spacing between the support plate 121 and the left side wall 61 of the lower case half 42B.

There is arranged in this spacing a speed reducing gear train constituting the power transmitting mechanism 115. The drive shaft 100A of the shift actuator 100 is geared to one end of the speed reducing gear train.

The power transmitting mechanism 115 has a first idle gear 116 as a large-diameter gear meshing with a gear formed on the drive shaft 100A of the shift actuator 100, a second idle gear 117 as a small-diameter gear rotating with the first idle gear 116, a third idle gear 118 as a large-diameter gear meshing with the second idle gear 117, a fourth idle gear 119 as a small-diameter gear rotating with the third idle gear 118, and a driven gear 120 mounted on the shift spindle 112 and meshing with the fourth idle gear 119. Accordingly, the rotation of the drive shaft 100A is reduced in speed by the first to fourth idle gears 116 to 119 and finally transmitted to the driven gear 120.

The first idle gear 116 and the second idle gear 117 are integrally formed and supported to the support plate 121 and the left side wall 61 of the crankcase 42.

The third idle gear 118 and the fourth idle gear 119 are also integrally formed and supported to the support plate 121 and the left side wall 61 of the crankcase 42. The third idle gear 118 and the driven gear 120 are formed as sector gears. As compared with the case of using circular gears, a space for locating the sector gears can be reduced to thereby make the power transmitting mechanism 115 compact.

The shift position sensor 125 is provided on the support plate 121 so as to be opposed to the support shaft 91A extending from the left end of the shift drum 91. A rotational angle of the support shaft 91A is detected by the shift position sensor 125, and a present shift position is detected according to this rotational angle. Further, a shift spindle angle sensor 126 for detecting a rotational angle of the shift spindle 112 is provided at the right end portion of the shift spindle 112.

As shown in FIG. 3, the generator cover 66 is composed of a circumferential wall 66A surrounding the outer circumference of the generator 67 and a side plate 66B integrated with the laterally outer end (left end) of the circumferential wall 66A. A portion of the circumferential wall 66A except its front upper portion is formed as an arcuate wall surface extending along the outer circumference of the generator 67 about the crankshaft 51.

Further, the sprocket cover (second cover member) 87 is composed of a circumferential wall 87A surrounding the outer circumference of the drive sprocket 85 (except its rear portion) and a side plate 87B integrated with the laterally outer end (left end) of the circumferential wall 87A. The circumferential wall 87A is formed as an arcuate wall surface extending along the outer circumference of the sprocket cover 87 about the output shaft 74A. The shapes of these covers 66 and 87 are general shapes in a motorcycle.

As shown in FIG. 3, the shift actuator 100 is located below the longitudinal range LA of the generator cover 66 in parallel to the crankshaft 51 as viewed in side elevation. Accordingly, a dead space below the generator cover 66 can be used to locate the shift actuator 100. Furthermore, the shift actuator 100 can be located in the vicinity of the shifting mechanism M2.

With this arrangement, any dedicated space for locating the shift actuator 100 is not required, but the shift actuator 100 can be located in the dead space below the generator cover 66. Furthermore, a power transmission path for connecting the shift actuator 100 and the shifting mechanism M2 can be reduced in length, so that the shift actuator 100 and the shifting mechanism M2 can be arranged compactly. Further, the spacing between the generator cover 66 and the sprocket cover 87 need not be increased to locate the shift actuator 100, so that the generator cover 66 and the sprocket cover 87 can be arranged closely.

As shown in FIG. 3, the generator cover 66 has an arcuate wall surface convex toward the shift actuator 100 above the shift actuator 100, and the sprocket cover 87 located adjacent to the generator cover 66 on the rear side thereof has an arcuate wall surface convex toward the generator cover 66. Accordingly, the area surrounded by the arcuate wall surfaces of these two cover members 66 and 87 is formed as an area AR1 (see FIG. 3) diverged in the longitudinal direction of the vehicle toward the lower side thereof as viewed in side elevation.

In this area AR1, there are arranged the shift position sensor 125, the shift spindle 112, the power transmitting mechanism 115, and the shift actuator 100 in this order from the upper side in the vertical direction along the arcuate wall surface (circumferential wall 66A) of the generator cover 66. With this arrangement, the shift position sensor 125 and the shift spindle 112 as relatively small-sized parts are located in the narrowest upper space of the area AR1, and the shift actuator 100 as a relatively large-sized part is located in the widest lower space of the area AR1. Thus, suitable spaces for locating the various parts can be ensured in the area AR1. Further, the above-mentioned order of arrangement of the parts in the area AR1 accords with a power transmission path between the shift actuator 100 and the transmission M1. Accordingly, this power transmission path can be efficiently reduced in length.

As to this power transmission path, the shift actuator 100 is located on the front lower side of the shift spindle 112, and the power transmitting mechanism 115 connecting the shift spindle 112 and the shift actuator 100 is located on the rear lower side of a straight path LS (see FIG. 3) as the shortest path connecting the shift spindle 112 and the shift actuator 100. With this arrangement, the shift spindle 112 and the shift actuator 100 can be arranged close to the circumferential wall 66A of the generator cover 66, and a sufficient transmission path length can be ensured to arrange the speed reducing gear train (gear mechanism) constituting the power transmitting mechanism 115. Thus, the area AR1 mentioned above can be effectively used.

As shown in FIG. 3, the shift actuator 100 is located at a level higher than that of the lowermost gears (the third idle gear 118 and the fourth idle gear 119) of the power transmitting mechanism 115. Accordingly, the level of the shift actuator 100 does not become too low, so that it is possible to suppress that the ground clearance of the motorcycle 1 may become too small and that the bank angle of the motorcycle 1 may be limited.

Figure 6:
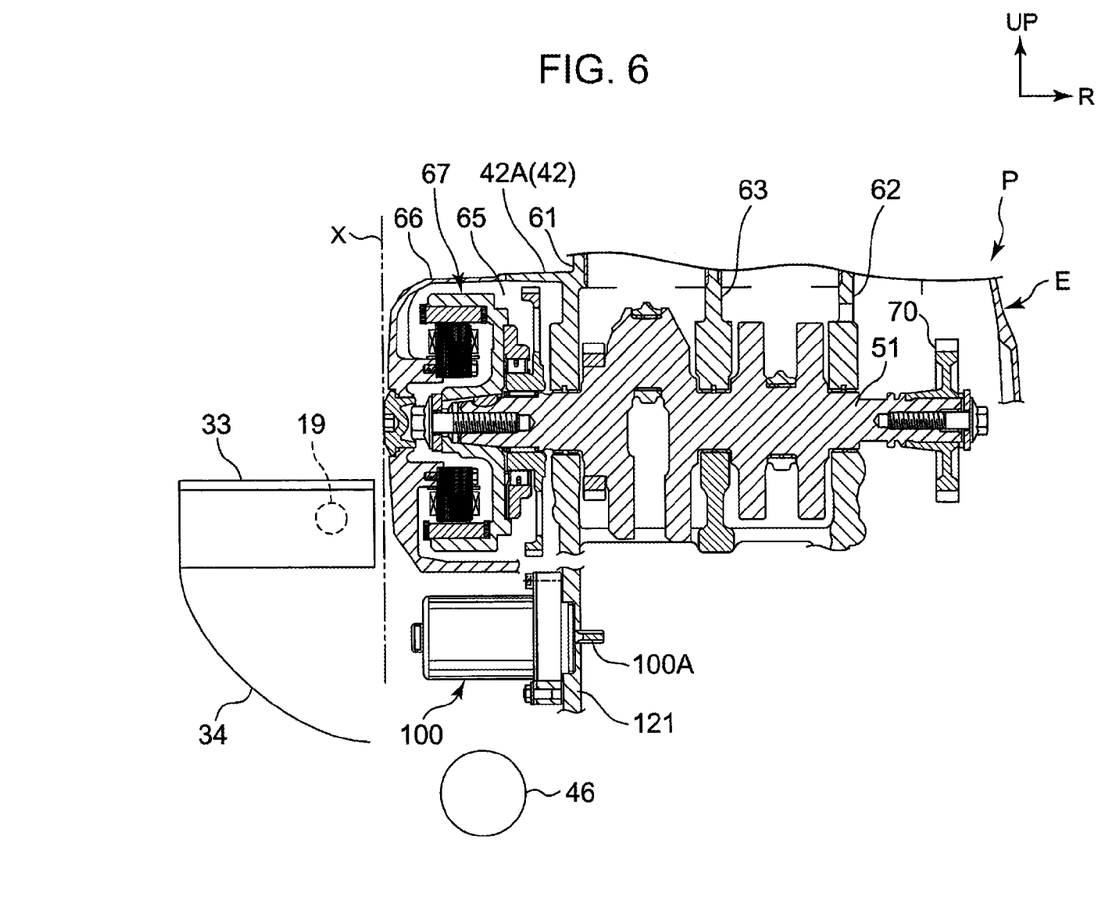
FIG. 6 is a view showing a positional relation between a shift actuator and its peripheral structure as viewed from the rear side of the vehicle.

FIG. 6 shows a positional relation between the shift actuator 100 and its peripheral structure as viewed from the rear side of the vehicle. As mentioned above, the shift actuator 100 is located in the area below the generator cover 66. Accordingly, as shown in FIG. 6, the shift actuator 100 can be located laterally inside the position X of the side plate 66B of the generator cover 66, i.e., the position of the laterally outermost end of the generator cover 66. Accordingly, an increase in maximum width of the engine (corresponding to the maximum width of the power unit P) due to the location of the shift actuator 100 can be avoided.

Further, as shown in FIGS. 6 and 3, the shift actuator 100 is located at a level lower than that of the foot rests 33 for the rider RD. Accordingly, the shift actuator 100 does not interfere with the foot rests 33 and a foot rest space for the rider RD can be ensured.

Further, the exhaust pipe 46 extends rearward from the power unit P below the shift actuator 100. Accordingly, the exhaust pipe 46 need not be bent so as to bypass the shift actuator 100, but can be arranged straight toward the rear side of the vehicle. In other words, in the case that the exhaust pipe 46 is located below the power unit P as in a general layout, the shift actuator 100 can be located in a dead space between the exhaust pipe 46 and the generator cover 66.

Further, the under covers 34 for covering the lower side of the foot rests 33 are located laterally outside the shift actuator 100. Accordingly, the exposure of the shift actuator 100 can be suppressed by the under covers 34, and the shift actuator 100 can be protected by the under covers 34. Further, the support frames 19 for supporting the foot rests 33 are also located laterally outside the shift actuator 100. Accordingly, the shift actuator 100 can also be protected by the support frames 19.

According to this preferred embodiment mentioned above, the motorcycle 1 has the generator cover 66 as a cover member mounted on one side of the crankcase 42 so as to cover an end portion of the crankshaft 51 projecting from the crankcase 42 and also has the shift spindle 112 located on the rear side of the generator cover 66 as an input member of the shifting mechanism (shifting means) M2, wherein the shift actuator 100 is located below the longitudinal range LA of the generator cover 66 in parallel to the crankshaft 51 and on the front side of the axis of the shift spindle 112. Accordingly, the dead space below the generator cover 66 can be efficiently used to locate the shift actuator 100. Further, the shift actuator 100 can be located near the shift spindle 112 and below the foot rests 33.

Accordingly, the shift actuator 100 and the shifting mechanism M2 including the shift spindle 112 can be arranged compactly and a foot rest space for the rider RD can also be ensured.

The generator cover 66 has the arcuate wall surface convex toward the shift actuator 100 above the shift actuator 100, and the sprocket cover 87 as another cover member located adjacent to the generator cover 66 has the arcuate wall surface convex toward the generator cover 66. Further, the shift spindle 112 is located in the area AR1 surrounded by the arcuate wall surfaces of the two cover members 66 and 87. Accordingly, the dead space between the two cover members 66 and 87 can be used to locate the shift spindle 112, thereby making the power unit P compact.

Further, the power transmitting mechanism 115 as a gear mechanism is provided between the shift spindle 112 and the shift actuator 100, and this power transmitting mechanism 115 is located in the area AR1. Accordingly, the dead space between the two cover members 66 and 87 can be used to locate the power transmitting mechanism 115 with its protuberance suppressed, thereby making the power unit P compact. In the case that an empty space is present inside the generator cover 66 or the sprocket cover 87 as viewed in side elevation of the vehicle, at least a part of the power transmitting mechanism 115 may be located in the area AR1 and the other part may be located in this empty space.

Further, the power transmitting mechanism 115 has the plural gears (the idle gears 116 to 119), and these gears (the idle gears 116 to 119) are located on the front lower side of the shift spindle 112 and arranged along the arcuate wall surface of the generator cover 66. Accordingly, the power transmitting mechanism 115 can be arranged compactly.

Further, as shown in FIG. 3, the shift actuator 100 is located at a level higher than that of the lowermost gears (the third idle gear 118 and the fourth idle gear 119) of the plural gears (the idle gears 116 to 119) of the power transmitting mechanism 115. Accordingly, it is possible to suppress that the ground clearance of the motorcycle 1 may become too small and that the bank angle of the motorcycle 1 may be limited.

Further, the exhaust pipe 46 extending rearward from the power unit P is located below the shift actuator 100. Accordingly, the exhaust pipe 46 need not be bent so as to bypass the shift actuator 100, but can be arranged straight toward the rear side of the vehicle.

Further, the power unit P is a power unit for the motorcycle 1 as a small-sized vehicle having the seat 27 adapted to be straddled by the rider RD, and the shift actuator 100 is located below the generator cover 66 of the power unit P. Accordingly, the shift actuator 100 is located at a level lower than that of the foot rests 33 for the rider RD in the motorcycle 1. Accordingly, the shift actuator 100 can be spaced apart from the foot rests 33, so that the shift actuator 100 can be protected from the feet of the rider RD and the comfort of the rider RD can also be ensured.

Further, the foot rests 33 are formed as floor steps elongated in the longitudinal direction of the vehicle, and the shift actuator 100 is located at a level lower than that of the support frames 19 for supporting the floor steps. Accordingly, the shift actuator 100 can be spaced apart from the support frames 19, and the shift actuator 100 can be protected by the support frames 19.

Further, the motorcycle 1 has the under covers 34 for covering the lower side of the foot rests 33, and the shift actuator 100 is covered on one side thereof by the under covers 34. Accordingly, the shift actuator 100 can also be protected by the under covers 34.

Figure 7:
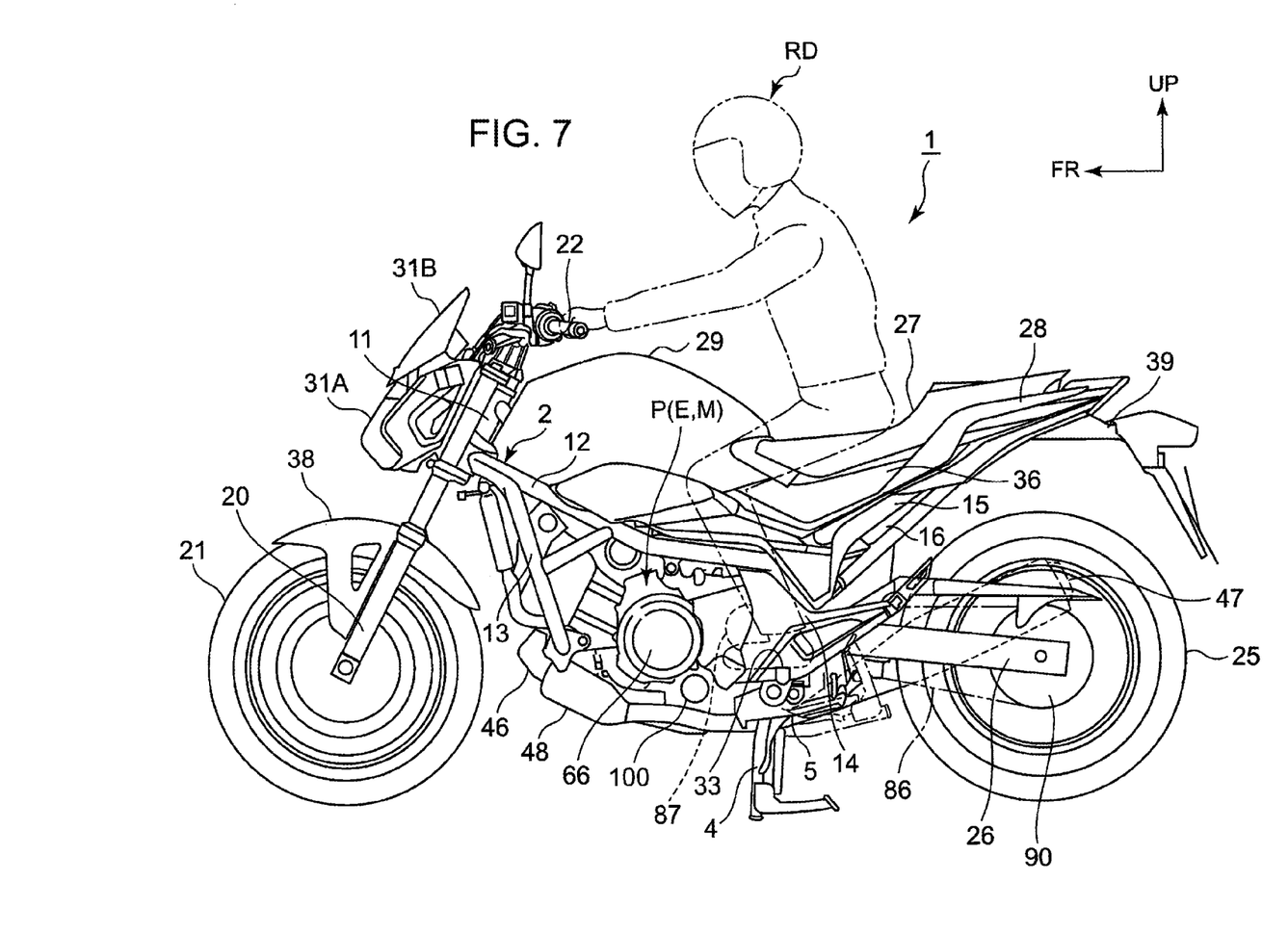
FIG. 7 is a left side view of a motorcycle according to a second preferred embodiment of the present invention.

FIG. 7 is a left side view of a motorcycle 1 according to a second preferred embodiment of the present invention.

In the second preferred embodiment, the motorcycle 1 has a cover (side cover 36) for covering a part of the body frame 2 rather than the body cowl 3 (see FIG. 1) for substantially fully covering the body frame 2. Further, the motorcycle 1 has a right and left foot rests 33 formed as step bars extending laterally outward from the lower portions of the right and left pivot frames 14 of the body frame 2. Further, a fuel tank 29 is located above the power unit P.

The other configuration is similar to that of the first preferred embodiment. In particular, the body frame 2 and the power unit P are the same as those of the first preferred embodiment, and the location of the power unit P on the front lower side of the body frame 2 is the same as that of the first preferred embodiment.

Also in the motorcycle 1 shown in FIG. 7, the shift actuator 100 is located at a level lower than that of the foot rests 33. Accordingly, as similar to the first preferred embodiment, the shift actuator 100 is located below the generator cover 66 and below the foot rests 33, and the shift actuator 100 and the shift spindle 112 are located in the area AR1 surrounded by the arcuate wall surfaces of the generator cover 66 and the sprocket cover 87. Accordingly, the shift actuator 100 and the shifting mechanism M2 including the shift spindle 112 can be arranged compactly and a foot rest space for the rider RD can be ensured as in the first preferred embodiment.

The present invention is not limited to the above preferred embodiments, but various modifications and changes may be made without departing from the scope of the present invention.

For example, while the circumferential wall 66A of the generator cover 66 and the circumferential wall 87A of the sprocket cover 87 have arcuate wall surfaces opposed to each other in the above preferred embodiments, the circumferential walls 66A and 87A may have polygonal wall surfaces. However, in summary, it is essential that the dead space between the generator cover 66 and the sprocket cover 87 is used to locate the shift actuator 100 and the shifting mechanism M2.

Further, while the drive source in the power unit P is provided by the engine (internal combustion engine) E in the above preferred embodiments, any other drive sources such as a drive motor may be used.

Further, while the present invention is applied to the motorcycle 1 in the above preferred embodiments, the present invention is applicable to any small-sized vehicle such as a saddle seat type vehicle having a seat adapted to be straddled by the rider RD. The saddle seat type vehicle includes various vehicles having a configuration such that an operator can straddle a vehicle body. These vehicles include a motorcycle (including a motor bike) and a vehicle classified as an ATV (all terrain vehicle) including a three-wheeled vehicle and a four-wheeled vehicle.

What is claimed is:

1. A shift actuator layout structure in a vehicle having a crankcase for rotatably supporting a crankshaft extending in the lateral direction of said vehicle, a power unit having a transmission provided in said crankcase, a shifting device configured to change a shift position in said transmission, a shift actuator for operating said shifting device, a gear mechanism provided between a shift spindle and said shift actuator, and a shift position sensor, wherein said vehicle has a cover member mounted on one side of said crankcase so as to cover an end portion of said crankshaft projecting from said crankcase and also said shift spindle located on a rear side of said cover member as an input member of said shifting device; and said shift actuator is located below a longitudinal range of said cover member in parallel to said crankshaft and on the front side of the axis of said shift spindle, wherein said cover member is a first cover member and has an arcuate wall surface convex toward said shift actuator above said shift actuator, and a second cover member is located adjacent to said first cover member, said second cover member having an arcuate wall surface convex toward said first cover member; and wherein in an area surrounded by said arcuate wall surfaces of said first and second cover members are said shift position sensor, said shift spindle, said gear mechanism and said shift actuator arranged in this order in a vertical direction of said vehicle along said arcuate wall surface of said first cover member.

2. The shift actuator layout structure in a vehicle according to claim 1, wherein said gear mechanism has a plurality of gears, and said gears are located on the front lower side of said shift spindle and arranged along said arcuate wall surface of said first cover member.

3. The shift actuator layout structure in a vehicle according to claim 2, wherein said shift actuator is located at a level higher than that of the lowermost gears of said plurality of gears.

4. The shift actuator layout structure in a vehicle according to claim 1, wherein said vehicle has an exhaust pipe extending rearward from said power unit, and said exhaust pipe is located below said shift actuator.

5. The shift actuator layout structure in a vehicle according to claim 1, wherein said vehicle is a small-sized vehicle having a seat adapted to be straddled by a rider;

said vehicle has foot rests for supporting the feet of said rider sitting on said seat; and said shift actuator is located at a level lower than that of said foot rests.

6. The shift actuator layout structure in a vehicle according to claim 5, wherein said foot rests are formed as floor steps elongated in the longitudinal direction of said vehicle; and said shift actuator is located at a level lower than that of support frames for supporting said floor steps.

7. The shift actuator layout structure in a vehicle according to claim 6, wherein said vehicle has under covers for covering the lower side of said foot rests; and said shift actuator is covered on one side thereof by said under covers.

8. The shift actuator layout structure in a vehicle according to claim 3, wherein said vehicle has an exhaust pipe extending rearward from said power unit, and said exhaust pipe is located below said shift actuator.

9. The shift actuator layout structure in a vehicle according to claim 3, wherein said vehicle is a small-sized vehicle having a seat adapted to be straddled by a rider;

said vehicle has foot rests for supporting the feet of said rider sitting on said seat; and said shift actuator is located at a level lower than that of said foot rests.

10. The shift actuator layout structure in a vehicle according to claim 9, wherein
- said foot rests are formed as floor steps elongated in the longitudinal direction of said vehicle; and
- said shift actuator is located at a level lower than that of support frames for supporting said floor steps.

11. The shift actuator layout structure in a vehicle according to claim 10, wherein
- said vehicle has under covers for covering the lower side of said foot rests; and
- said shift actuator is covered on one side thereof by said under covers.

* * * * *